Patented Sept. 3, 1935

2,013,602

UNITED STATES PATENT OFFICE 2,013,602

PIGMENT PRODUCT

George L. Collord, Pittsburgh, Pa.

No Drawing. Application October 23, 1933,
Serial No. 694,892

10 Claims. (Cl. 134—58)

This invention relates to the employment of furnace slag in neutralizing acid-laden water with the production of a useful by-product, and finds practical application in so neutralizing the water of streams contaminated with acid from one source or another as for example the seepage from bituminous coal mines and which carries deleterious quantities of sulfuric acid. The proposal heretofore has been made to neutralize such waters by means of limestone, blast furnace slag, and other basic alkaline materials, but no technique has been developed and the proposal has never been carried into successful operation.

One feature of this invention is the use of basic open-hearth slag, as distinguished from blast-furnace slag, and it consists in treatment in such manner and under such circumstances as to effect neutralization in adequate and practical degree, and to afford the recovery of valuable substances in marketable form and condition. The result is that the operation is economically possible, as otherwise it would not be. It is obvious that acid-laden water may be neutralized; the problem has been to effect neutralization on large scale with such economy as to render it practicable.

Beginning with open-hearth slag as it comes from the furnace, I crush it and bring it to finely divided or pulverized condition. I do this in preparation for effective use in neutralizing, and incidentally, I release from the slag and separate from it particles of steel which have been splashed into and solidified within and become embedded in the slag. These I recover with profit. The ordinary run of open-hearth slag may contain steel in quantity as great as ten to fifteen percent of the whole, or even more. The crushing or grinding means may be such as are found convenient. Ordinarily, a stamping mill or jaw crusher will be found adequate.

The particles of steel may be removed from the crushed slag before the operation proceeds further and they may be removed by sifting, by picking, or by magnetic separation or released by the crushing of the magma of slag which contains them, they may be carried forward into the further operation and ultimately recovered by gravitational separation or sedimentation.

Another feature of this invention is the recovery of a precipitated reaction product formed during the neutralization of the acid-laden waters, which is useful as a pigment and also for addition to cement for increasing the tensile strength thereof. This invention may be carried out by causing the crushed or comminuted slag to be introduced into the water to be neutralized, and when introduced the whole is maintained in a state of agitation to stimulate chemical reaction. It is requisite to successful operation that the finely divided material be maintained by agitation in a distributed or dispersed state in the body of water, otherwise chemical reaction is hindered to such degree as to render the operation impracticable. The point of neutrality is approached but preferably not actually attained. Such nice control of reaction is possible when using basic open hearth slag, but is not possible with blast furnace slag or limestone, because with the former reagent the chemical action is slower.

When the condition indicated above, of approaching neutrality has been reached, agitation is stopped and the solid and precipitated material is allowed to settle. This material is preponderantly of two sorts; first, the excess of slag, and second, the precipitated reaction. Of these, the slag is the heavier so by sedimentation and decantation or more particularly hydroseparation, it may be recovered or separated from the precipitates. Such gravitational separation cannot be effected if blast-furnace slag or limestone is used as the reagent, for in either case the lime (which is the chief constituent of blast-furnace slag) has a specific gravity so closely approaching that of the precipitates as to render gravitational separation thereof from the slag difficult or practically impossible. From the sedimentation or hydroseparation apparatus, there overflows an effluent containing the water which has been treated and the precipitates. The precipitates are then recovered from the water by the use of a thickener or a filter. The treated water from which the precipitates have been removed or separated is returned to the stream, substantially relieved of objectionable acidity.

An example of the composition of a slag suitable for use in carrying out the invention is:

| | Percent. |
|---|---|
| $SiO_2$ | 16. |
| $Al_2O_3$ | 5. |
| $CaO$ | 44. |
| $MgO$ | 5.5 |
| $Fe$ | 18.2 |
| $Mn$ | 8.9 |
| $P$ | .854 |

Another example of the composition of a suitable slag is:

| | Percent. |
|---|---|
| $SiO_2$ | 12. |
| $Al_2O_3$ | 7. |
| $CaO$ | 43. |
| $MgO$ | 6. |
| $Fe$ | 18. |
| $Mn$ | 9. |
| $P$ | .8 |

The operation of agitating the water and recovering the precipitates may be carried out in a tank equipped with a stirring apparatus of simple and obvious sort. In case the particles of steel have not previously been separated, it is obvious that in the agitation tank they will sink at once to the bottom, and after sedimentation may readily be recovered. The method is applicable to all water contaminated with sulfuric acid; for example, waters discharged from the acid tanks in sheet and tin-plate mills, and from oil refineries.

When the acidic mine waters are thus treated with ground open hearth slag, or other such basic materials, to set up a chemical reaction therebetween for the purpose of neutralizing the mine waters, a precipitated reaction product is formed which contains the oxides and hydrates of iron, manganese, lime and magnesium as well as gypsum and possibly other sulfates. These precipitates are separated and recovered as above described. They are then ready for further treatment, namely, to be dried and used for pigments, since the colors of pigment obtained therefrom range from dark red to light yellow. They are eminently suited for this use since they are recovered in a finely divided form, and therefore they require little if any grinding. When dried, most of the material is minus 200 mesh in fineness. When mixed with oils and used as a paint coating for metals, they seem to be more acid resisting than the usual oxide paints. These precipitates may also be used as an admixture for cement to increase its tensile strength, as well as coloring it. For this use however, they are more effective when calcined. The calcined precipitates can be added to the cement at the time of laying, or the dried precipitates can be added to the cement making materials and be burned simultaneously therewith. These precipitates also appear to hasten the setting of cement when mixed therewith.

I claim:

1. A new article of manufacture comprising a separated precipitated reaction product, resulting from mixing acid mine waters and basic open hearth slag.

2. A new article of manufacture comprising a dried separated precipitated reaction product resulting from mixing liquid containing sulfuric acid and comminuted basic open hearth slag.

3. A new article of manufacture comprising a calcined separated precipitated reaction product resulting from mixing a sulfuric acid containing liquid and pulverized basic open hearth slag.

4. A new article of manufacture comprising a cement containing a separated calcined precipitated reaction product resulting from mixing a sulfuric acid containing liquid and finely divided basic open hearth slag.

5. A new article of manufacture comprising a paint containing a separated precipitated reaction product resulting from mixing a sulfuric acid bearing water and pulverized basic open hearth slag.

6. A method of treating slag from a basic open hearth steel furnace comprising reducing the slag to a finely divided condition, agitating the finely divided slag with water containing sulfuric acid to stimulate a reaction therebetween to produce a precipitate, separating and recovering the precipitate by hydroseparation and then drying the precipitate.

7. The method according to claim 6 in which the precipitate recovered by hydroseparation is thickened prior to drying.

8. The method according to claim 6 in which the dried precipitate is calcined.

9. The method according to claim 6 in which the agitation of the mixture is continued until the point of neutrality of reaction is approached but not reached.

10. A method of treating slag from a basic open hearth steel furnace comprising reducing the slag to a finely divided condition, agitating the finely divided slag with water containing sulfuric acid to stimulate a reaction therebetween to produce a precipitate, separating the unreacted slag from the precipitate in suspension by hydroseparation, separating the precipitate from the solution and drying the precipitate.

GEORGE L. COLLORD.